(12) United States Patent
Hirata et al.

(10) Patent No.: US 7,864,489 B2
(45) Date of Patent: Jan. 4, 2011

(54) THIN-FILM MAGNETIC HEAD HAVING AN ANTISTATIC LAYER PREVENTING A PROTECTIVE COAT FROM BEING ELECTROSTATICALLY CHARGED

(75) Inventors: Kei Hirata, Tokyo (JP); Takeo Kagami, Chou-ku (JP); Takumi Uesugi, Chou-ku (JP); Tetsuro Sasaki, Chou-ku (JP)

(73) Assignee: TDK Corporation, Tokyo (JP)

( * ) Notice: Subject to any disclaimer, the term of this patent is extended or adjusted under 35 U.S.C. 154(b) by 913 days.

(21) Appl. No.: 11/678,913

(22) Filed: Feb. 26, 2007

(65) Prior Publication Data
US 2008/0204938 A1 Aug. 28, 2008

(51) Int. Cl.
*G11B 5/33* (2006.01)
(52) U.S. Cl. ...................... 360/320; 360/323
(58) Field of Classification Search ................ 360/323, 360/320, 122, 128, 123.37
See application file for complete search history.

(56) References Cited

U.S. PATENT DOCUMENTS

| | | | | |
|---|---|---|---|---|
| 4,897,747 A * | 1/1990 | Meunier et al. | ............. | 360/122 |
| 6,160,688 A * | 12/2000 | Okumura | .................... | 360/323 |
| 6,331,924 B1 * | 12/2001 | Takada | ...................... | 360/323 |
| 6,493,182 B1 * | 12/2002 | Yamanaka et al. | .......... | 360/122 |
| 6,995,948 B2 * | 2/2006 | Nakayama | .................. | 360/122 |
| 6,995,958 B2 * | 2/2006 | Zhu | .......................... | 360/323 |
| 7,159,301 B2 * | 1/2007 | Sasaki et al. | ............. | 29/603.12 |
| 7,170,713 B2 * | 1/2007 | Gider et al. | ................. | 360/128 |
| 7,193,817 B2 * | 3/2007 | Lille | .......................... | 360/128 |
| 7,203,035 B2 * | 4/2007 | Koide et al. | .............. | 360/294.7 |
| 7,320,174 B2 * | 1/2008 | Cowles et al. | ................. | 29/852 |
| 7,392,579 B2 * | 7/2008 | Leung et al. | ............. | 29/603.16 |
| 2002/0036875 A1 * | 3/2002 | Ajiki et al. | .................... | 360/323 |
| 2003/0021065 A1 * | 1/2003 | Yamada et al. | .............. | 360/126 |
| 2005/0207069 A1 * | 9/2005 | Suda | .......................... | 360/323 |
| 2005/0280934 A1 * | 12/2005 | Nakayama | .................... | 360/122 |
| 2006/0044678 A1 * | 3/2006 | Flint et al. | ................... | 360/122 |
| 2006/0132985 A1 * | 6/2006 | Ohtsu et al. | ................. | 360/323 |

FOREIGN PATENT DOCUMENTS

| | | |
|---|---|---|
| JP | 05-046941 A | 2/1993 |
| JP | 06-243434 A | 9/1994 |
| JP | 2001-084543 A | 3/2001 |
| JP | 2001-250207 A | 9/2001 |
| JP | 2005-011409 A | 1/2005 |

\* cited by examiner

*Primary Examiner*—Julie Anne Watko
(74) *Attorney, Agent, or Firm*—Frommer Lawrence & Haug LLP

(57) ABSTRACT

Provided is a thin-film magnetic head in which a noise due to the voltage potential difference between the read head element and the protective coat surface is suppressed. The thin-film magnetic head comprises: a read head element, one end surface of the read head element reaching an head end surface on the ABS side; a protective coat formed on the head end surface in such a way to cover at least the one end surface of the read head element; and at least one antistatic means for preventing the protective coat from being electrostatically charged, formed on/above the element formation surface, one end surface of the at least one antistatic means reaching the head end surface, the protective coat covering a portion, not the whole, of the one end surface of the at least one antistatic means on the head end surface.

28 Claims, 8 Drawing Sheets

TRACK WIDTH DIRECTION

Fig. 1a
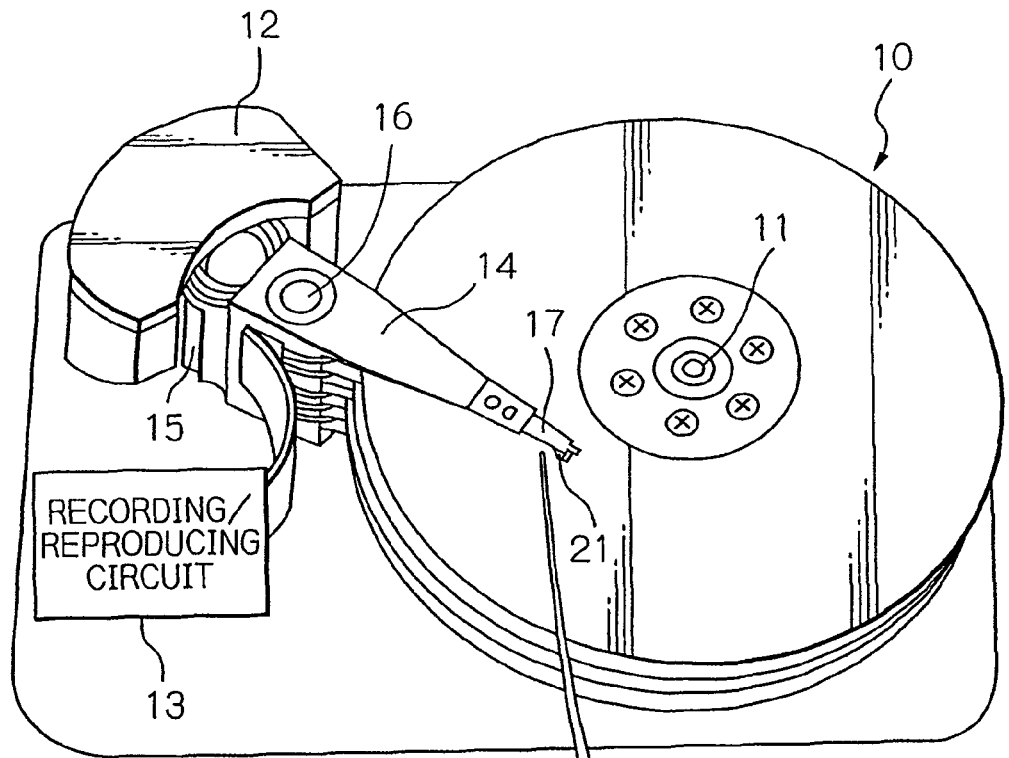
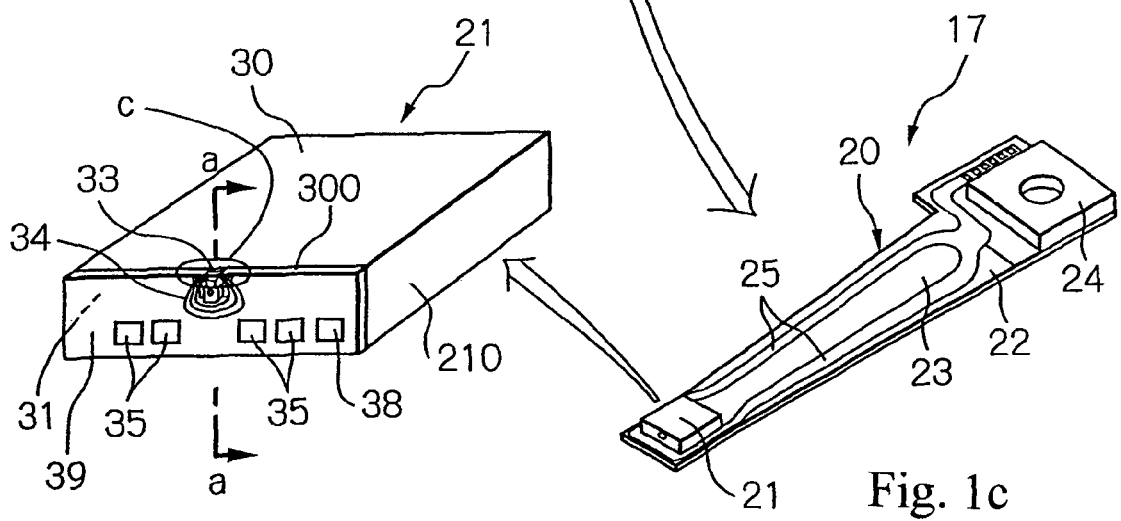
TRACK WIDTH
DIRECTION
Fig. 1b
Fig. 1c

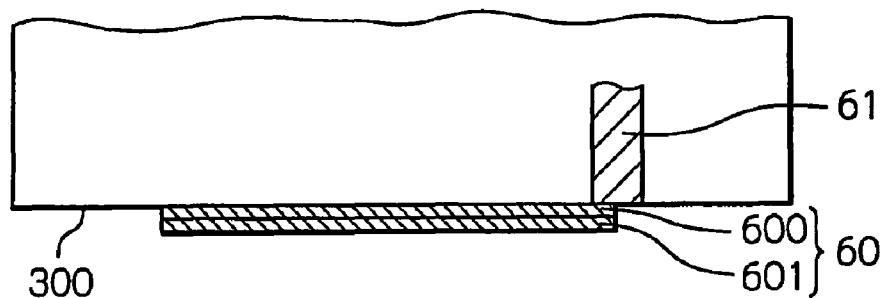
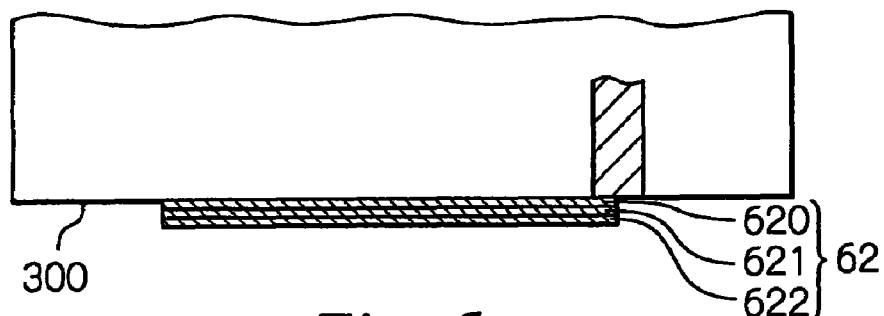
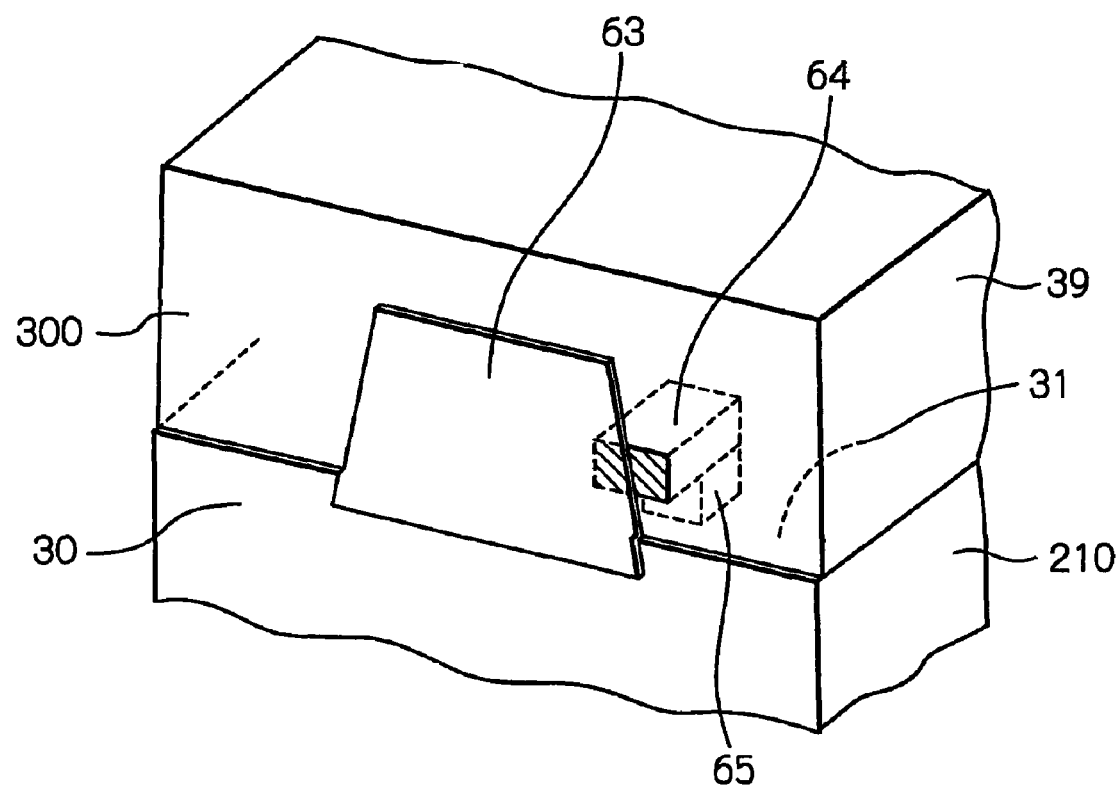

THIN-FILM MAGNETIC HEAD HAVING AN ANTISTATIC LAYER PREVENTING A PROTECTIVE COAT FROM BEING ELECTROSTATICALLY CHARGED

BACKGROUND OF THE INVENTION

1. Field of the Invention

The present invention relates to a thin-film magnetic head for magnetic recording which writes data to a magnetic recording medium and/or reads data from the medium, a head gimbal assembly (HGA) provided with the thin-film magnetic head, and a magnetic recording/reproducing apparatus provided with the HGA. Especially, the present invention relates to a thin-film magnetic head having an antistatic means for a protective coat of element ends.

2. Description of the Related Art

As magnetic recording/reproducing apparatuses, in particular magnetic disk drive apparatuses, increase in capacity and reduce in size, thin-film magnetic heads are required to have higher sensitivity and larger output. To respond to the requirement, a tunnel magnetoresistive (TMR) effect, which is expected to show extremely high resistance-change ratio, attracts attention, and actually thin-film magnetic heads having the TMR effect element as a read head element for reading data are being intensively developed.

The TMR effect element has a structure in which a TMR effect multilayer is sandwiched between two electrode layers. The TMR effect multilayer has a magnetization-pinned layer (pinned layer) in which the magnetization direction is fixed, a magnetization-free layer (free layer) in which the magnetization direction can change according to an applied magnetic field, and a tunnel barrier layer as an energy barrier in the tunneling effect which is sandwiched between the pinned layer and the free layer. Therefore, a sense current, which is applied during detecting magnetic field, flows in a direction perpendicular to the layer planes of the TMR effect multilayer as well as in the case of a current-perpendicular-to-plane giant magnetoresistive (CPP-GMR) effect element.

One end surfaces of the two electrode layers and the TMR effect multilayer in the TMR effect element reach a head end surface on the air bearing surface (ABS) side of a slider substrate. Further, a protective coat, which is made of an insulating film such as a diamond-like carbon (DLC), is usually formed on the head end surface so as to cover the end surfaces of the electrode layers and TMR effect multilayer, and protects these end surfaces from wearing with the magnetic disk.

Conventionally, the above-mentioned head has a possibility that a noise occurs in read signals due to an electrostatic charge on the head. The noise is caused, for example, by a discharge between the magnetic medium such as a magnetic disk and the head. As a measure against the discharge, for example, Japanese Patent Publication No. 05-46941A describes a thin-film magnetic head that has a ground structure for preventing the discharge, formed of a non-magnetic conductive material. Further, in some cases, an ion milling process causes an electrostatic charge of the TMR effect element. As the measure against the electrostatic charge, for example, Japanese Patent Publication No. 2005-11409A describes a thin-film magnetic head in which the electrostatic charge is prevented by devising the formation order of the head elements. Furthermore, the contact of a magnetoresistive (MR) effect element with the magnetic disk might cause an electrostatic charge of the MR effect element, which has a possibility to bring a damage or breakdown of the MR effect element. As the measure against the electrostatic charge, for example, Japanese Patent Publication No. 06-243434A describes a technique providing a film with a predetermined electric resistivity on an opposed-to-medium surface of the head.

Further, though in the case of a giant magnetoresistive (GMR) effect element, Japanese Patent Publication No. 2001-250207A describes a technique in which a resistor is provided, for example, between upper and lower magnetic shields to prevent the destruction of the GMR effect element due to large currents flowing when an electrostatic breakdown of the element occurs. Furthermore, Japanese Patent Publication No. 2001-84543A describes a technique in which a bump connected with head elements is provided on one end surface of the slider substrate to avoid an electrostatic breakdown of the head element during deposition by using an electron-cyclotron-resonance chemical vapor deposition (ECR-CVD) method or during dry-etching, in the head manufacturing process.

However, there has been a conventional problem that a noise may occur, which is caused by a capacitor formed between the surface of the protective coat made of an insulating film such as a DLC and the end surfaces reaching the head end surface of the two electrode layers and the TMR effect multilayer. The capacitor may be generated by the voltage potential difference due to the electrostatic charge between the surface of the protective coat and the end surfaces of the two electrode layers and the TMR effect multilayer. The electrostatic charge may be generated by, for example, the friction with the magnetic recording medium during loading. It is significantly difficult to solve this noise problem even by using the above-described conventional art.

For example, the provision of the film with a predetermined electric resistivity on an opposed-to-medium surface of the head described in Japanese Patent Publication No. 06-243434A can avoid the formation of the capacitor. However, the film cannot be applied to the case with a TMR effect element because the film short-circuits the two electrode layers of the element.

As a further problem, the tunnel barrier layer of the TMR effect element is formed of an insulating material. Therefore, an electrostatic charge may be generated between the pinned layer and the free layer sandwiching the tunnel barrier layer during a period of not operating when a sense current does not flow. As a result, the electrostatic charge causes a voltage potential difference between the TMR effect element and the surface of the protective coat. In this case, when the end surface of the TMR effect element has a smear as a short-circuiting part such as polish traces or the tunnel barrier layer has pinholes, these parts act as a trap site to accumulate electric charges. And when a read operation starts and the sense current flows, an electric noise may be generated due to the non-uniform voltage application to the tunnel barrier layer. It is also significantly difficult to solve this electric noise problem even by using the above-described conventional art.

Further, the CPP-GMR effect element has end surfaces of the two electrode layers and the GMR effect multilayer, which reach the head end surface on the ABS side of the slider substrate, as well as the TMR effect element has. Therefore, the CPP-GMR effect element also has the above-described problem that the noise may occur, which is caused by the voltage potential difference due to the electrostatic charge between the end surface of the element and the surface of the protective coat. Therefore, it is also significantly difficult for a thin-film magnetic head with the CPP-GMR effect element to solve the noise problem by using the above-described conventional art.

BRIEF SUMMARY OF THE INVENTION

Therefore, an object of the present invention is to provide a thin-film magnetic head with a TMR effect element or a CPP-GMR effect element for reading data in which a noise due to the voltage potential difference between the read head element and the surface of the protective coat is suppressed, and an HGA including the thin-film magnetic head, and a magnetic recording/reproducing apparatus including the HGA.

Before describing the present invention, terms used herein will be defined. In a multilayer structure formed on the element formation surface of a substrate in a thin-film magnetic head, a layer or a portion of the layer located closer to the substrate than a standard layer is referred to as being located "lower" than, "beneath" or "below" the standard layer, and a layer or a portion of the layer located on the stacking direction side in relation to a standard layer is referred to as being located "upper" than, "on" or "above" the standard layer. However, in the relation between the end of an element and a protective coat of the element end, in the head end surface on the ABS side, the protective coat is defined to be formed "on" the element end, and the surface opposed to a magnetic recording medium of the protective coat is defined to be an "upper surface".

According to the present invention, a thin-film magnetic head is provided, which comprises: a substrate having an air bearing surface (ABS); a read head element for reading data, formed on/above an element formation surface of the substrate, one end surface of the read head element reaching an head end surface on the ABS side; a protective coat formed on the head end surface in such a way to cover at least the one end surface of the read head element; and at least one antistatic means for preventing the protective coat from being electrostatically charged, formed on/above the element formation surface, one end surface of the at least one antistatic means reaching the head end surface, the protective coat covering a portion, not the whole, of the one end surface of the at least one antistatic means on the head end surface.

The above-described configuration, especially covering a portion, not the whole, of the one end surface of the antistatic means with the protective coat, can eliminate a voltage potential difference due to the electrostatic charge which is being generated between the surface of the protective coat and the MR effect element. The mechanism of the elimination is that a charge moves from the surface of the protective coat to the antistatic means or in the reverse direction. As a result, the noise due to the voltage potential difference can be suppressed.

In the thin-film head according to the present invention, a resistivity of the at least one antistatic means is preferably lower than a resistivity of the substrate. In the case, the amount of the resistivity of the at least one antistatic means is preferably less than 1000 micro-ohm centimeters (μΩcm), and it is also preferable that the substrate is formed of AlTiC, and the at least one antistatic means is formed of a metal.

Further, it is also preferable that the protective coat has a two-layered structure in which a base film and a protective film are sequentially stacked, or the protective coat has a three-layered structure in which a base film, an intermediate film and a protective film are sequentially stacked, and a resistivity of the intermediate film is lower than both resistivities of the base film and the protective film.

Further, in the head according to the present invention, the at least one antistatic means is preferably provided adjacently on one side or on both sides in the track width direction of the read head element. And the at least one antistatic means is preferably connected to ground. In the case, at least one of the at least one antistatic means is preferably electrically connected to the element formation surface of the substrate by a connect means. Further, it is also preferable that the read head element is a TMR effect element.

In the case that the read head element is a TMR effect element, an electric noise may be generated in the output of the TMR effect element due to the existence of smears or pinholes. In the head according to the present invention, the electric noise can be suppressed.

According to the present invention, a head gimbal assembly (HGA) is further provided, which comprises: the above-described thin-film magnetic head; signal lines for the read head element; a connection line for connecting at least one antistatic means to ground; and a support means for supporting the thin-film magnetic head.

According to the present invention, a magnetic recording/reproducing apparatus is further provided, which comprises: at least one HGA; at least one magnetic disk; and a recording/reproducing means for controlling read and write operations of the thin-film magnetic head to the at least one magnetic disk.

Further objects and advantages of the present invention will be apparent from the following description of preferred embodiments of the invention as illustrated in the accompanying drawings.

BRIEF DESCRIPTION OF THE SEVERAL VIEWS OF THE DRAWINGS

FIGS. 1a-1c show perspective views schematically illustrating a configuration of one embodiment of a magnetic disk apparatus, an HGA and a thin-film magnetic head according to the present invention;

FIGS. 6a to 6e show plain views and a perspective view schematically illustrating alternatives to the protective coat and the antistatic layer;

DETAILED DESCRIPTION OF THE INVENTION

Figure 2:
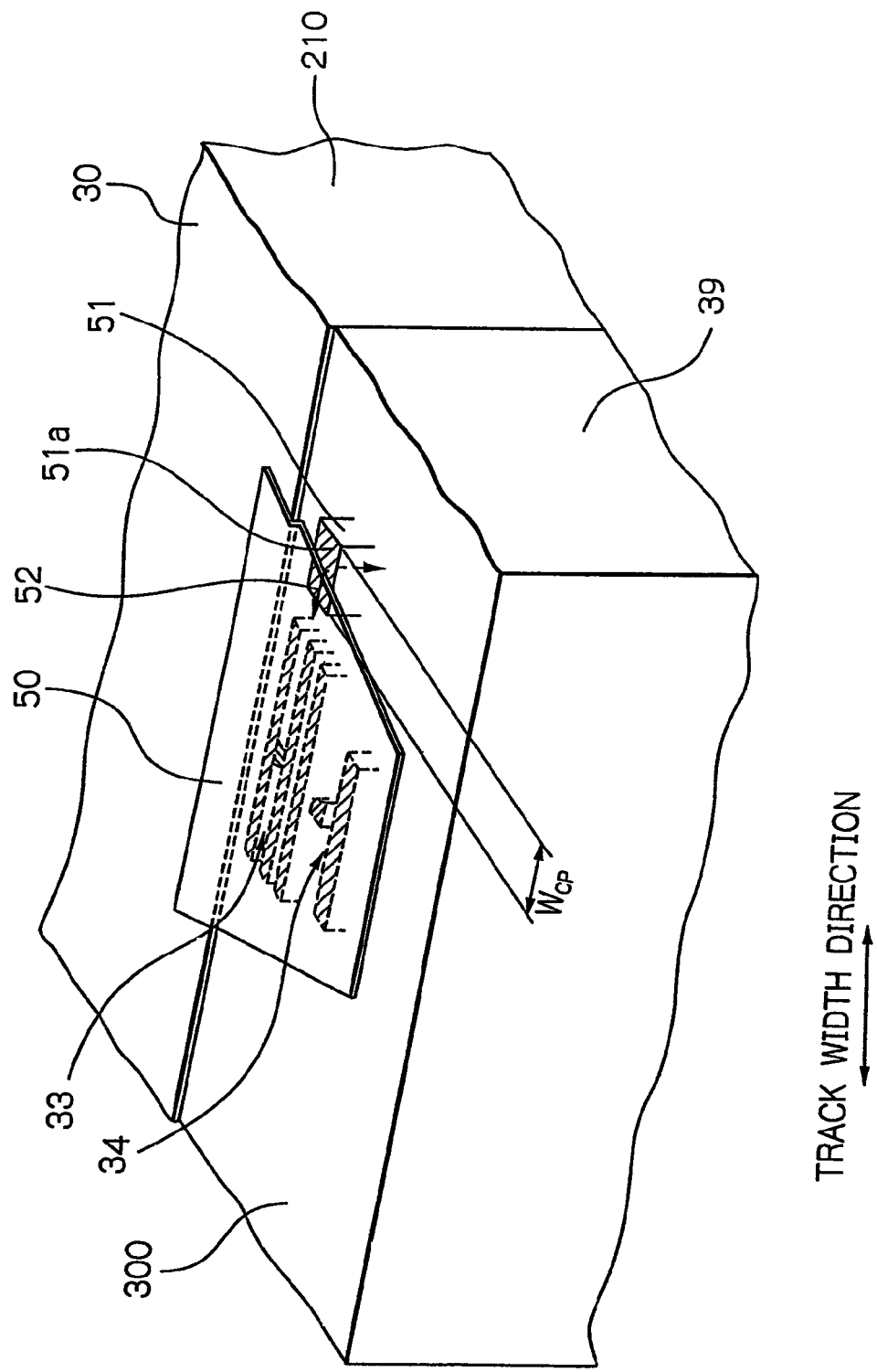
FIG. 2 shows a magnified perspective view schematically illustrating a configuration in region c of FIG. 1.

FIGS. 1a-c show perspective views schematically illustrating a configuration of one embodiment of a magnetic recording/reproducing apparatus, an HGA and a thin-film magnetic head according to the present invention. In magnified views of the HGA and the thin-film magnetic head of FIGS. 1b and 1c, the side opposed to a magnetic disk is turned upward.

The magnetic recording/reproducing apparatus shown in FIG. 1a is a magnetic disk drive apparatus, which includes multiple magnetic disks 10 as magnetic recording media that rotate about a spindle of a spindle motor 11, an assembly carriage device 12 provided with multiple drive arms 14, an HGA 17 attached on the end portion of each drive arm 14 and provided with a thin-film magnetic head (slider) 21, and a recording/reproducing circuit 13 for controlling read/write operations.

The assembly carriage device 12 is provided for positioning the thin-film magnetic head 21 above a track formed on the magnetic disk 10. In the device 12, the drive arms 14 are stacked along a pivot bearing axis 16 and are capable of angular-pivoting about the axis 16 driven by a voice coil motor (VCM) 15. The numbers of magnetic disks 10, drive arms 14, HGAs 17, and thin-film magnetic heads 21 may be one.

While not shown, the recording/reproducing circuit 13 includes a recording/reproducing control LSI, a write gate for receiving data to be recorded from the recording/reproducing control LSI, an write circuit for outputting a signal from the write gate to an electromagnetic coil element for writing data, which will be described later, a constant current circuit for supplying a sense current to an MR effect element for reading data, which will also be described later, an amplifier for amplifying output voltage from the MR effect element, and a demodulator circuit for demodulating the amplified output voltage and outputting reproduced data to the recording/reproducing control LSI.

Also as shown in FIG. 1b in the HGA 17, the thin-film magnetic head 21 is fixed and supported on the end portion of a suspension 20 in such a way to face the surface of each magnetic disk 10 with a predetermined spacing (flying height). And one end of a wiring member 25 is connected to electrodes of the thin-film magnetic head 21.

The suspension 20 includes a load beam 22, an flexure 23 with elasticity fixed on the load beam 22, a base plate 24 provided on the base portion of the load beam 22, and a wiring member 25 that is provided on the flexure 23 and consists of lead conductors as signal lines and connection pads electrically connected to both ends of the lead conductors. Further, the suspension 20 may be provided with a connection line for electrically connecting an antistatic layer described later, which is one of the main elements of the present invention, to the suspension 20 connected to ground. When the thin-film magnetic head 21 has a ground pad as described later, one end of the connection line may be connected to the ground pad. While not shown, a head drive IC chip may be attached at some midpoints of the suspension 20.

Also as shown in FIG. 1c, the thin-film magnetic head 21 includes: a slider substrate having an air bearing surface (ABS) 30 processed so as to provide an appropriate flying height and an element formation surface 31; an MR effect element 33 as a read head element for reading data and an electromagnetic coil element 34 as a write head element for writing data which are formed on/above the element formation surface 31; an overcoat layer 39 formed so as to cover the MR effect element 33 and the electromagnetic coil element 34; and four signal electrodes 35 exposed in the upper surface of the overcoat layer 39. Here, the ABS 30 of the thin-film magnetic head 21 is opposed to the magnetic disk 10. The MR effect element 33 is a TMR effect element or a CPP-GMR effect element. Further, in this embodiment, respective two of the four signal electrodes 35 are connected to the MR effect element 33 and the electromagnetic coil element 34, and a ground pad 38 may be provided, which is exposed in the upper surface of the overcoat layer 39, connected to an antistatic layer described later and used for connecting the antistatic layer to ground.

FIG. 2 shows a magnified perspective view schematically illustrating a configuration in region c of FIG. 1c.

As shown in FIG. 2, one end surfaces of the MR effect element 33 and the electromagnetic coil element 34 reach the head end surface 300 on the ABS 30 side. These end surfaces face the magnetic disk 10, and then, a read operation is performed by sensing a signal magnetic field from the disk, and a write operation is performed by applying a write magnetic field to the disk.

Further, provided are a protective coat 50 of the element ends and an antistatic layer 51. The protective coat 50 is provided so as to cover at least the end surfaces of the elements 33 and 34, and formed of such as diamond-like carbon (DLC) or, for example, an oxide, nitride or carbide of such as Al (aluminum), Ti (titanium), Si (silicon) or Ta (tantalum) with a thickness of approximately 1 to 7 nanometers (nm). The protective coat 50 covers a portion of the head end surface 300, and in this embodiment, has a trapezoidal shape with the longer edge extending to the ABS 30. As a matter of course, the shape of the protective coat is not limited to this one, and may be, for example, triangular, quadrangular, circular or elliptical, which surely cover the end surfaces of the elements. The protective coat 50 prevents a direct contact between the end surfaces of the elements and the surface of the magnetic disk during loading of the head or when the apparatus is shocked, to protect the element ends.

The antistatic layer 51 is an antistatic means for preventing the protective coat 50 from being electrostatically charged. The antistatic layer 51 has an end surface 51a reaching to the head end surface 300, and is connected to ground though not shown. As the ground, the ground pad 38 connected to ground, grounded electrodes or a grounded slider substrate 210 can be used. Further, on the head end surface 300, a portion, not the whole, of the end surface 51a of the antistatic layer 51 is covered with the protective coat 50. That is to say, the uncovered portion other than the covered portion of the antistatic layer 51 is exposed in the head end surface 300.

The above-described configuration can eliminate a voltage potential difference between the surface (upper surface opposed to the medium) of the protective coat 50 and the MR effect element 33 when the voltage potential difference is being generated by the electrostatic charge of the upper surface of the protective coat 50. The mechanism of the elimination is that a charge moves from the surface of the protective coat 50 to the antistatic layer 51 or in the reverse direction, as indicated by an arrow 52. The charge on the surface of the protective coat 50 is capable of moving with a certain degree by the power ON or power OFF operation to the MR effect element or by the change of the amount of heat or stress in the protective coat 50 even though the protective coat 50 is formed of an insulating material. As a result, the noise due to the voltage potential difference can be suppressed. If the whole of the end surface 51a is covered with the protective coat 50, the charge cannot move at all between the surface of the protective coat 50 and the antistatic layer 51. Therefore, the existence of the portion of the end surface 51a which is not covered with the protective coat 50 is a required condition for the present invention.

The amount of resistivity of the constituent material of the antistatic layer 51 is set to be smaller than that of the slider substrate 210. For example, in the case that the slider substrate is formed of AlTiC ($Al_2O_3$—TiC), the antistatic layer 51 may be formed of, for example, a metal such as Ru, Ti, Au, Al, Pt, Cu, Rh, Ir, Pd, Ni, Fe, Co, Ta, Hf, Mo or Zr, or an alloy of at least two of these metal elements. In the present embodiment, some amount of the charge can move between the surface of the protective coat 50 and the slider substrate 210.

However, for example, AlTiC as a constituent material of the slider substrate has a resistivity of approximately 1000 to 10000 micro-ohm centimeters (μΩcm), and therefore, the charge can not move sufficiently. On the contrary, the provision of the antistatic layer 51 with a resistivity of less than 1000 μΩcm can eliminate the voltage potential difference by surely moving the charge. To facilitate the charge movement, the antistatic layer 51 is preferably provided near the MR effect element 33 as much as possible when viewed from the head end surface 300 side. Further, in the present embodiment, though the antistatic layer 51 is provided adjacent to the MR effect element 33 and on one side in the track width direction of the element 33, the antistatic layer 51 may be provided in other positions. It is also possible that multiple antistatic layers are provided. In the case, though not shown, respective two antistatic layers may be provided on both sides in the track width direction of the MR effect element 33.

The width $W_{CP}$ in the track width direction of the antistatic layer 51 is set to be a predetermined lower limit or more so that the end surface 51a of the antistatic layer 51 has a portion uncovered with the protective coat 50, that is, so that the charge can surely move between the surface of the protective coat 50 and the antistatic layer 51. Actually, the width $W_{CP}$ is preferably 2 micrometers (μm) or more under the consideration of the degree of pattern accuracy in the protective coat formation.

Figure 3:
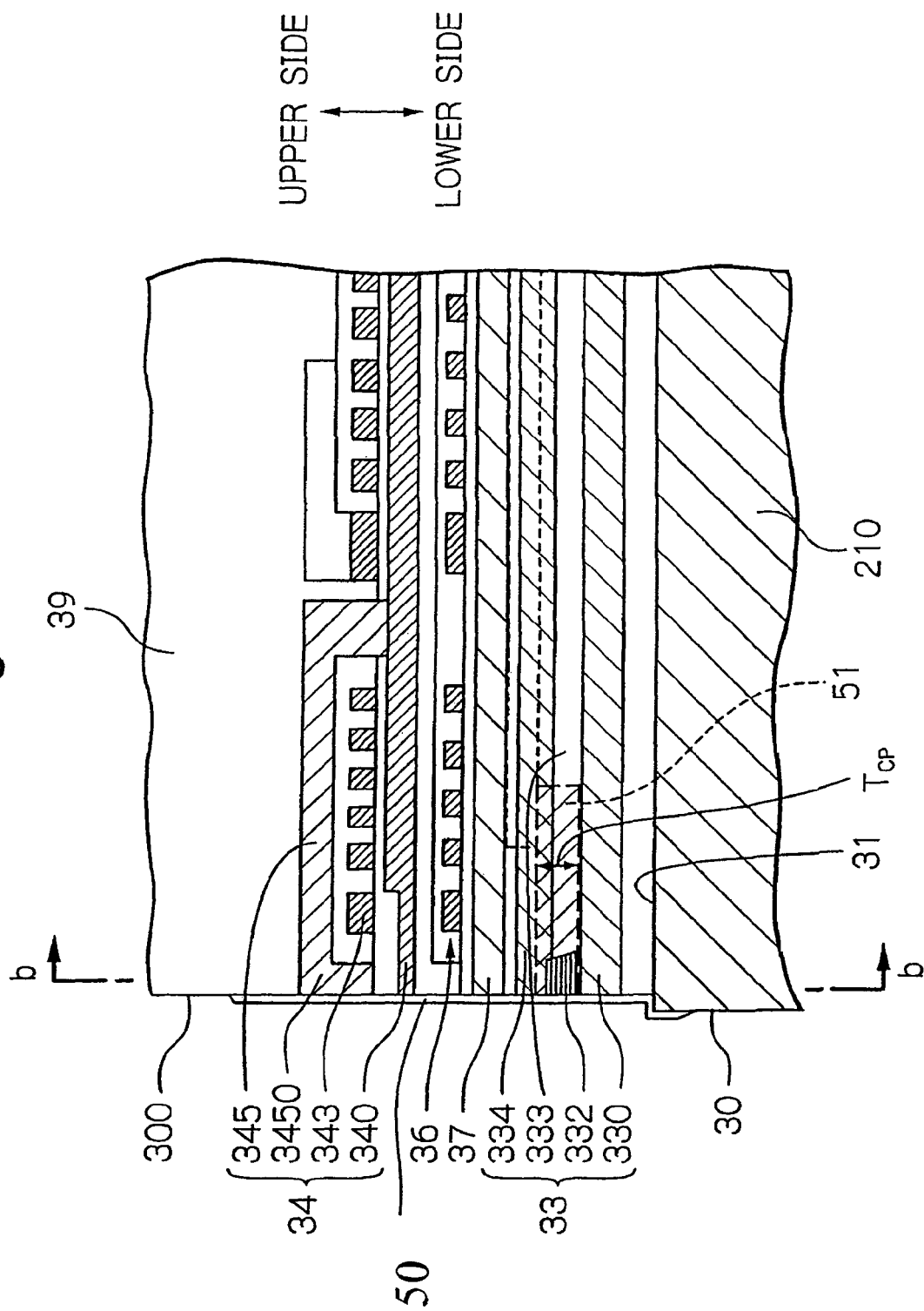
FIG. 3 shows a cross-sectional view taken along line a-a in FIG. 1 schematically illustrating a main portion of the thin-film magnetic head.

FIG. 3 shows a cross-sectional view taken along line a-a in FIG. 1 schematically illustrating a main portion of the thin-film magnetic head 21. In the figure, the electromagnetic coil element 34 is for perpendicular magnetic recording. However, it may be an electromagnetic coil element for longitudinal magnetic recording, which has a write coil layer and upper and lower magnetic pole layers whose end portions on the head end surface side pinch a write gap layer.

In FIG. 3, the MR effect element 33 is a TMR effect element or a CPP-GMR effect element, and includes an MR effect multilayer 332, an insulating layer 333 covering at least the rear side surface of the multilayer 332, and a lower electrode layer 330 and an upper electrode layer 334 which sandwich the MR effect multilayer 332 and the insulating layer 333. The MR effect multilayer 332 senses a signal field from the magnetic disk with very high sensitivity. The upper and lower electrode layers 334 and 330 are electrodes for applying a sense current in the direction perpendicular to the stacking plane of the MR effect multilayer 332, and further play a role of shielding external magnetic fields that cause noise for the MR effect multilayer 332.

Also as shown in FIG. 3, the electromagnetic coil element 34 is for perpendicular magnetic recording in the present embodiment, and includes a main magnetic pole layer 340 formed of a soft-magnetic material such as NiFe (Permalloy), CoFeNi, CoFe, FeN or FeZrN, a write coil layer 343 formed of an conductive material such as Cu (copper), and an auxiliary magnetic pole layer 345 formed of a soft-magnetic material such as NiFe (Permalloy), CoFeNi, CoFe, FeN or FeZrN. The main magnetic pole layer 340 is a magnetic path for converging and guiding a magnetic flux excited by a write current flowing through the write coil layer 343 to the record layer of the magnetic disk 10. The length in the stacking direction (thickness) of the end portion on the head end surface 300 side of the main magnetic pole layer 340 becomes smaller than that of the other portions. As a result, the main magnetic pole layer 340 can generate fine write fields corresponding to higher density recording. The write coil layer 343 has a monolayer structure in FIG. 3, however, may have a two or more layered structure or a helical coil shape. Further, the number of turns of the write coil layer 343 is not limited to that shown in the figure.

The end portion in the head end surface 300 side of the auxiliary magnetic pole layer 345 becomes a trailing shield portion 3450 that has a length in the stacking direction (thickness) larger than that of the other portions. The trailing shield portion 3450 causes a magnetic field gradient between the end portion of the trailing shield portion 3450 and the end portion of the main magnetic pole layer 340 to be steeper. As a result, a jitter of signal outputs becomes smaller, and therefore, an error rate during reading can be reduced.

Further, in the present embodiment, a backing coil portion 36 and an inter-element shield layer 37 are provided between the MR effect element 33 and the electromagnetic coil element 34. The backing coil portion 36 suppresses a wide area adjacent-track erase (WATE) behavior, which is an unwanted write or erase operation to the magnetic disk, by generating a magnetic flux for negating the magnetic flux loop that arises from the electromagnetic coil element 34 through the upper and lower electrode layers 334 and 330 of the MR effect element 33.

Also as shown in FIG. 3, the protective coat 50 is formed on the head end surface 300, and covers the end surfaces of the upper and lower electrode layers 334 and 330, the MR effect multilayer 332, the inter-element shield layer 37, the main magnetic pole layer 340 and the auxiliary magnetic pole layer 345. In the case where the electromagnetic coil element 34 is provided for longitudinal magnetic recording, the end surfaces of the upper and lower magnetic pole layers, instead of the main and auxiliary magnetic pole layers 340 and 345, are covered with the protective coat 50. Further, in FIG. 3, the antistatic layer 51 is shown by break lines, which is provided adjacently on one side in the track width direction of the MR effect element 33. The layer thickness $T_{CP}$ of the antistatic layer 51 is, for example, approximately 5 to 1000 nm. Here, the antistatic layer 51 can be formed, for example, by the following process: After the lower electrode layer 330 is formed through planarization, the above-described metal or alloy such as Ru is deposited by using a sputtering method, and then the antistatic layer 51 is formed by patterning the deposited metal or alloy with a lift-off method or an ion-milling method. As a matter of course, the forming process is not limited to the above one.

Figure 4:
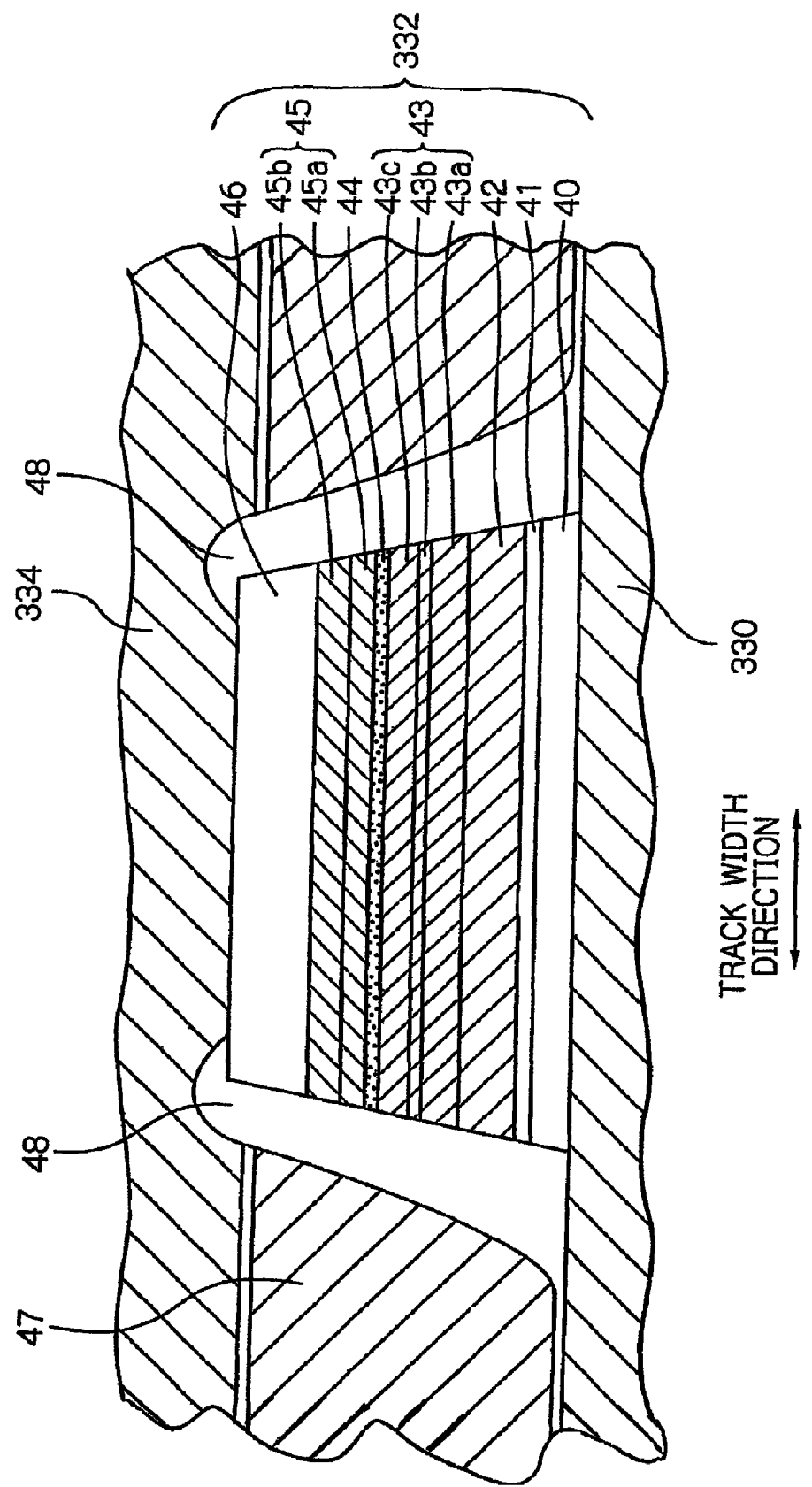
FIG. 4 shows a cross-sectional view taken along line b-b in FIG. 3 viewed from the head end surface side, schematically illustrating a layered structure of an embodiment of the MR effect multilayer.

FIG. 4 shows a cross-sectional view taken along line b-b in FIG. 3 viewed from the head end surface side, schematically illustrating a layered structure of an embodiment of the MR effect multilayer 332.

In FIG. 4, the MR effect multilayer 332 is a TMR effect multilayer, and has a multilayered structure in which a lower metal layer 40, a base layer 41, an antiferromagnetic layer 42 formed of an antiferromagnetic material, a pinned layer 43 formed of a ferromagnetic material, a tunnel barrier layer 44 formed of an oxide, a free layer 45 formed of a ferromagnetic material, and an upper metal layer 46 are stacked sequentially.

The lower metal layer 40 is provided on the lower electrode layer 330, and electrically connects the MR effect multilayer 332 to the lower electrode layer 330. The lower metal layer 40 is formed of, for example, Ta, Hf, Nb, Zr, Ti, Mo or W with a thickness of approximately 0.5 to 7 nm, and the lower electrode layer 330 is formed of a soft-magnetic conductive material such as NiFe, CoFeNi, CoFe, FeN or FeZrN with a thickness of approximately 0.3 to 5 μm. Further, the upper metal layer 46 electrically connects the MR effect multilayer 332 to the upper electrode layer 334 by providing the upper electrode layer 334 on the upper metal layer 46. Therefore, during detecting a signal field (during a read operation), a sense current flows in the direction perpendicular to the surface of each stacked layer of the MR effect multilayer 332. The upper metal layer 46 is formed of, for example, Ta, Ru, Hf, Nb, Zr, Ti, Cr, Mo or W with a thickness of approximately 1 to 20 nm, and the upper electrode layer 334 is formed of a soft-magnetic conductive material such as NiFe, CoFeNi, CoFe, FeN or FeZrN with a thickness of approximately 0.5 to 5 μm.

The antiferromagnetic layer 42 is provided above the lower metal layer 40 through the base layer 41. The base layer 41 is formed of, for example, NiCr or NiFe with a thickness of approximately 3 to 8 nm, and the antiferromagnetic layer 42 is formed of, for example, IrMn, PtMn, NiMn or RuRhMn with a thickness of approximately 3 to 18 nm. The pinned layer 43 is provided on the antiferromagnetic layer 42, and has namely a synthetic-ferri-pinned structure in which a first ferromagnetic film 43a, a non-magnetic film 43b and a second ferromagnetic film 43c are sequentially stacked from the antiferromagnetic layer 42 side. The first ferromagnetic film 43a receives an exchange bias field due to the exchange interaction with the antiferromagnetic layer 42. As a result, the whole magnetization of the pinned layer 43 is stably fixed. Here, the first ferromagnetic film 43a is formed of, for example, CoFe with a thickness of approximately 1 to 4 nm, the non-magnetic film 43b is formed of, for example, Ru, Rh, Ir, Cr, Re or Cu with a thickness of approximately 0.5 to 2 nm, and the second ferromagnetic film 43c is formed of, for example, CoFe with a thickness of approximately 1 to 5 nm.

The tunnel barrier layer 44 is provided on the pinned layer 43, and the free layer 45 is provided in such a way that the free layer 45 and the pinned layer 43 sandwich the tunnel barrier layer 44. The free layer 45 has a two-layered structure in which a high polarizability film 45a and a soft-magnetic film 45b are sequentially stacked from the tunnel barrier layer 44 side. The magnetization of the free layer 45 makes a ferromagnetic tunnel coupling together with the magnetization of the pinned layer 43 with the tunnel barrier layer 44 as a barrier of the tunnel effect. Thus, when the magnetization direction of the free layer 45 changes in response to a signal field, a tunnel current increases/decreases due to the variation in the state densities of up and down spin bands of the pinned layer 43 and the free layer 45, and therefore, the electric resistance of the MR effect multilayer 332 changes. The measurement of this resistance change enables a weak and local signal field to be surely detected with high sensitivity.

The tunnel barrier layer 44 may be formed of an oxidized film with a thickness of 0.6 to 2 nm, obtained by oxidizing a base film made of a metal such as Al, Mg, Ti, Hf, Zn, Ta, Zr, Mo, W, Sn, Ni, Gd, Nb, Ga or Ge, or Si, or may be formed by using a sputtering method with a target made of an oxide of at least one of these elements. The high polarizability film 45a is formed of, for example, CoFe with a thickness of approximately 0.5 to 2 nm, and the soft-magnetic film 45b is formed of, for example, NiFe with a thickness of approximately 1 to 8 nm.

As a matter of course, the mode of each layer of the MR effect multilayer 332 is not limited to the above-described one. For example, the pinned layer 43 may have a monolayer structure of a ferromagnetic film, or a multilayered structure with other number of layers. Further, the free layer 45 may have a monolayer structure without a high polarizability film, or may have a more-than-two-layered structure including a film for adjusting magnetostriction. The antiferromagnetic layer, the pinned layer, the tunnel barrier layer and the free layer may be stacked in the reverse order, that is, the free layer, the tunnel barrier layer, the pinned layer and the antiferromagnetic layer may be stacked in this order. Further, the MR effect multilayer 332 may be a CPP-GMR effect multilayer in which an intermediate layer formed of a non-magnetic metal material is provided instead of the tunnel barrier layer.

Also as shown in FIG. 4, hard bias layers 47 may be provided on both sides in the track width direction of at least the free layer 45 through insulating layers 48. Further, though not shown in the figure, an in-stack bias multilayer may be provided, in which a bias non-magnetic layer, a bias ferromagnetic layer and a bias antiferromagnetic layer are sequentially stacked between the free layer 45 and the upper metal layer 46. These bias means promote the stability of magnetic domains in the free layer 45 by applying a bias field to the free layer 45, to realize an stable linear output of the MR effect element.

FIGS. 5a to 5d show cross-sectional views for explaining the voltage potential difference between the MR effect element 33 and the protective coat 50 which causes noise.

Figure 5A:
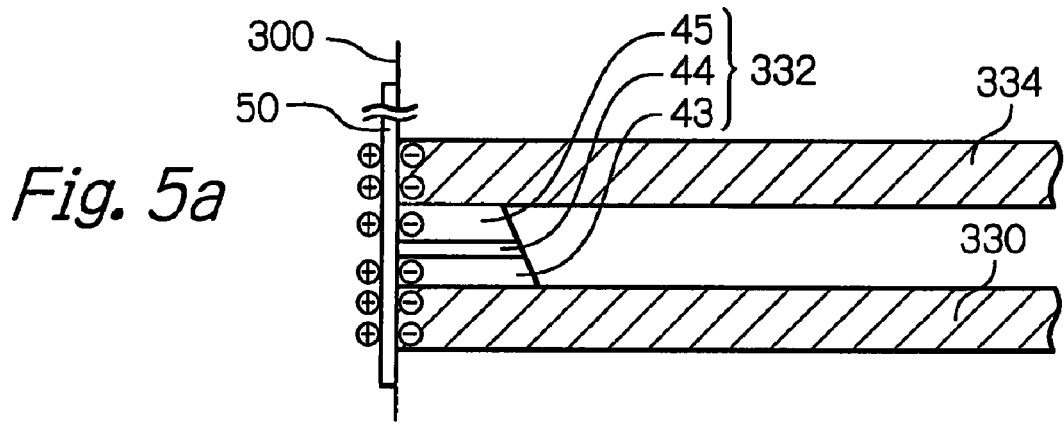
FIGS. 5a to 5d show cross-sectional views for explaining the voltage potential difference between the MR effect element and the protective coat that causes noise.
Figure 5B:
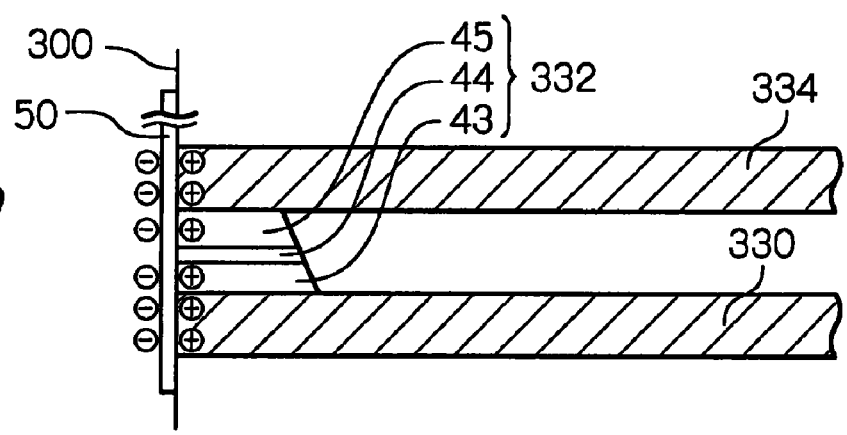

According to FIG. 5a, the end surfaces extending to the head end surface 300 of the upper and lower electrode layers 334 and 330 and the MR effect multilayer 332 of the MR effect element 33 have a negative charge, while the surface of the protective coat 50 charges positively. As a result, a voltage potential difference is generated between the end surface of the MR effect element 33 and the surface of the protective coat 50. This static charge is generated by, for example, the friction between the head and the medium during loading. Further, FIG. 5b shows the case where the signs of charges in both sides are reverse. That is, the end surface of the MR effect element 33 has a positive charge, and the surface of the protective coat 50 has a negative charge, to generate a voltage potential difference between them.

In both cases, these voltage potential differences can cause an electric noise to be generated in the output of the MR effect element 33 because the portion of the protective coat 50 having a contact with the end surface of the MR effect element 33 acts as a capacitor. The configuration including the above-described antistatic layer 51 according to the present invention can suppress the noise by eliminating the voltage potential difference.

Figure 5C:
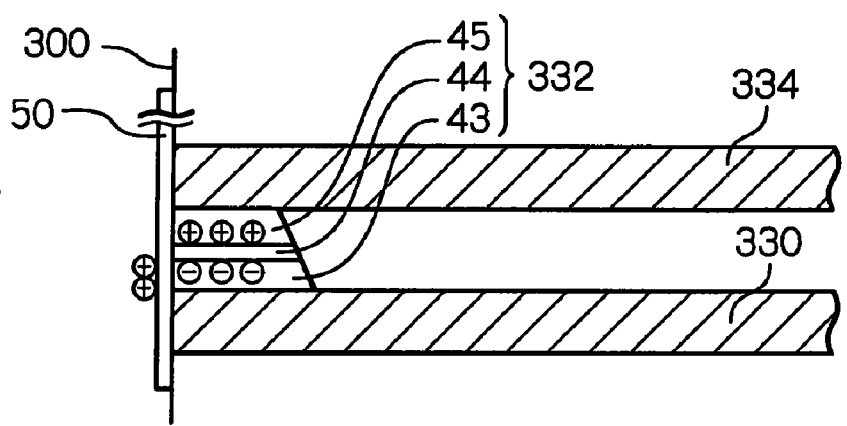
Figure 5D:
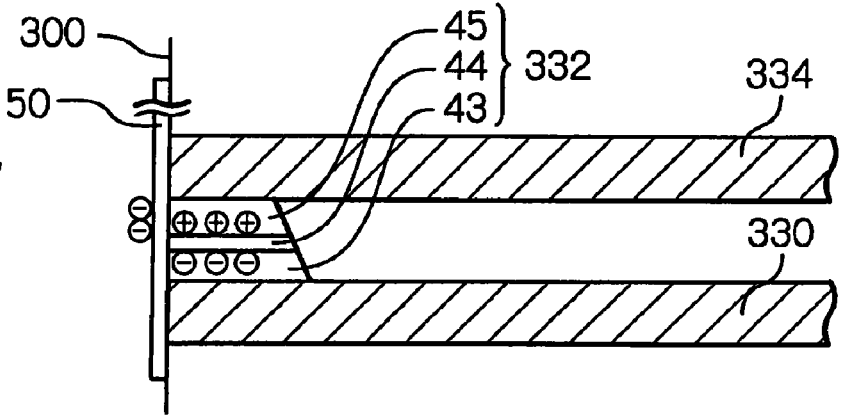

In FIGS. 5c and 5d of the case in which the MR effect element 33 is a TMR effect element, during a period of not operating when a sense current does not flow, an static charge is generated between the pinned layer 43 and the free layer 45 which sandwich the tunnel barrier layer 44. As a result, a voltage potential difference is generated between the MR effect element 33 and the surface of the protective coat 50. FIG. 5c shows the case in which the surface of the protective coat 50 has a positive charge, while FIG. 5d shows the case in which the surface of the protective coat 50 has a negative charge. In both cases, when the end surface of the MR effect element 33 has a smear as a short-circuiting part such as polish traces or the tunnel barrier layer 44 has pinholes, these parts act as a trap site to accumulate electric charge. And when a read operation starts, that is, a voltage is applied between the upper and lower electrode layers 334 and 330 and the sense current flows, an electric noise may be generated due to the non-uniform voltage application to the tunnel barrier layer 44 caused by the existence of the trap site. The configuration including the above-described antistatic layer 51 according to the present invention can suppress the noise by eliminating the voltage potential difference.

Even in the case that the MR effect element for reading data is a CPP-GMR effect element, the voltage potential difference shown in FIGS. 5a and 5b can be generated. Therefore, the generation of the above-described noise becomes problematic. As a countermeasure in this case, the configuration including the above-described antistatic layer according to the present invention can suppress this noise.

FIGS. 6a to 6e show plain views and a perspective view schematically illustrating alternatives to the protective coat and the antistatic layer.

According to FIG. 6a, a protective coat 60 covers a portion of the end surface of an antistatic layer 61. The protective coat 60 has a two-layered structure in which a base film 600 and a protective film 601 are sequentially stacked on the head end surface 300. The base film 600 may be formed of, for example, Si, SiO, SiN or SiON, and the protective film 601 may be formed of, for example, DLC. According to FIG. 6b, a protective coat 62 has a three-layered structure in which a base film 620, an intermediate film 621 and a protective film 622 are sequentially stacked on the head end surface 300. The base film 620 may be formed of, for example, Si, SiO, SiN or SiON, the intermediate film 621 may be formed of, for example, $TiO_2$, Si, $Ta_2O_5$, and the protective film 622 may be formed of, for example, DLC. In these material choices, the resistivity of the intermediate film 621 is set to be lower than both resistivities of the base film 620 and the protective film 622. The setting of these resistivities effects the suppression of the electric noise due to the movement of the substantial amount of charges through the intermediate film 621 with lower resistivity.

According to FIG. 6c, a protective coat 63 covers a portion of the end surface of an antistatic layer 64 which is electrically connected to the slider substrate 210 by a connect portion 65. The bottom surface of the connect portion 65 has a contact with the element formation surface 31 of the slider substrate 210, and the slider substrate 210 is connected to ground. As a result, the antistatic layer 64, and consequently the surface of the protective coat 63, can be connected to ground. Generally, either of the upper and lower electrode layers of the MR effect element 33 is connected to ground. Therefore, the voltage potential difference between the MR effect element 33 and the surface of the protective coat 63 can be eliminated by connecting the surface of the protective coat 63 to ground.

Figure 6D:
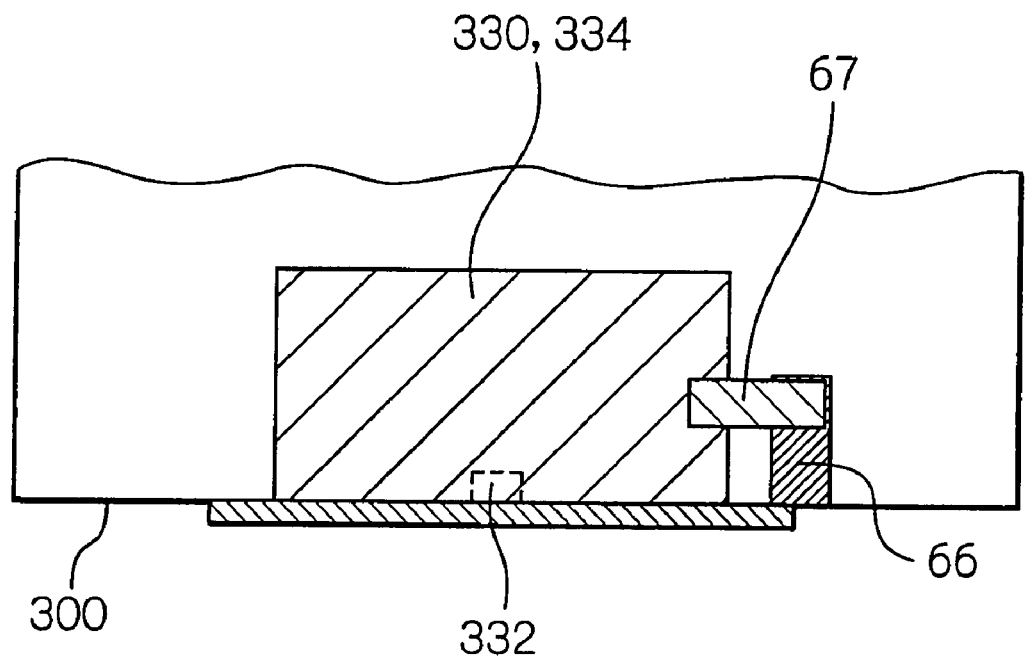

According to FIG. 6d, an antistatic layer 66 is electrically connected to either layer connected to ground of the upper and lower electrode layers 334 and 330 of the MR effect element 33 by a connect portion 67. As a result, the antistatic layer 66, and consequently the surface of the protective coat, can be connected to ground. Therefore, the voltage potential difference between the MR effect element and the surface of the protective coat can be eliminated.

Figure 6E:
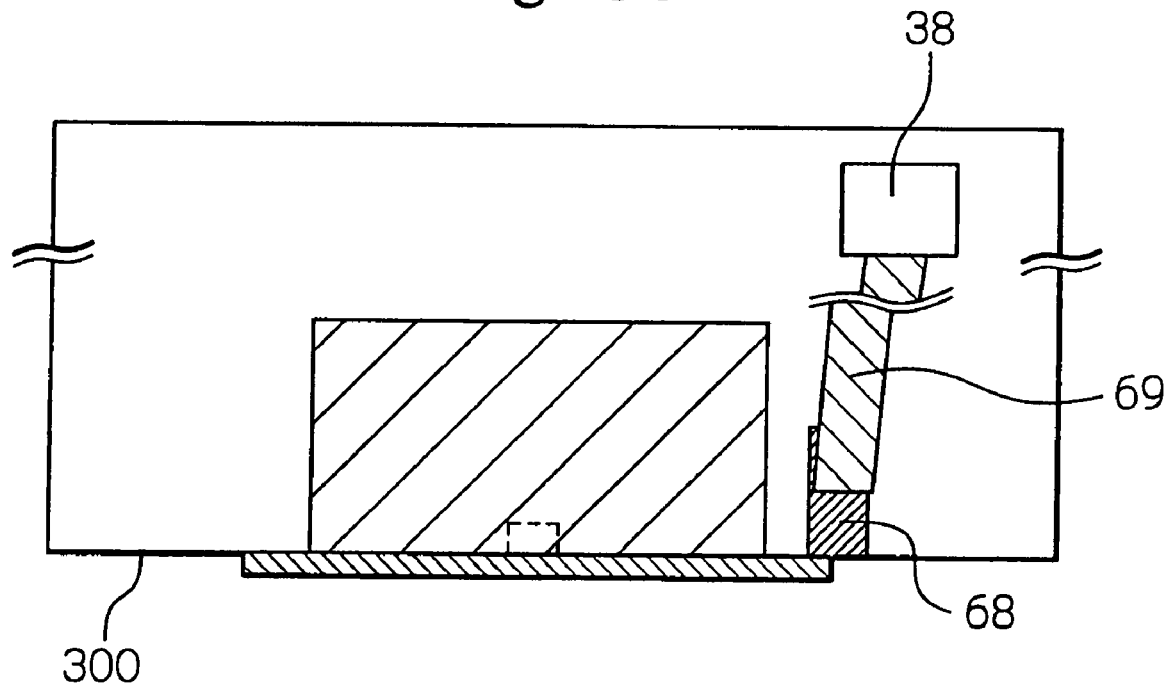

According to FIG. 6e, an antistatic layer 68 is electrically connected to a ground pad 38 by a lead layer 69. The ground pad 38 is electrically connected to the suspension 20 that is connected to ground when the HGA is constructed. As a result, the antistatic layer 68, and consequently the surface of the protective coat, can be connected to ground. Therefore, the voltage potential difference between the MR effect element and the surface of the protective coat can be eliminated. The ground pad to which the antistatic layer 68 is connected may be a ground pad provided for the MR effect element.

Hereinafter, a practical example of the thin-film magnetic head according to the present invention and a comparative example of the conventional thin-film magnetic head will be presented, and the noise suppression effect of the thin-film magnetic head according to the present invention will be explained.

Figure 7A:
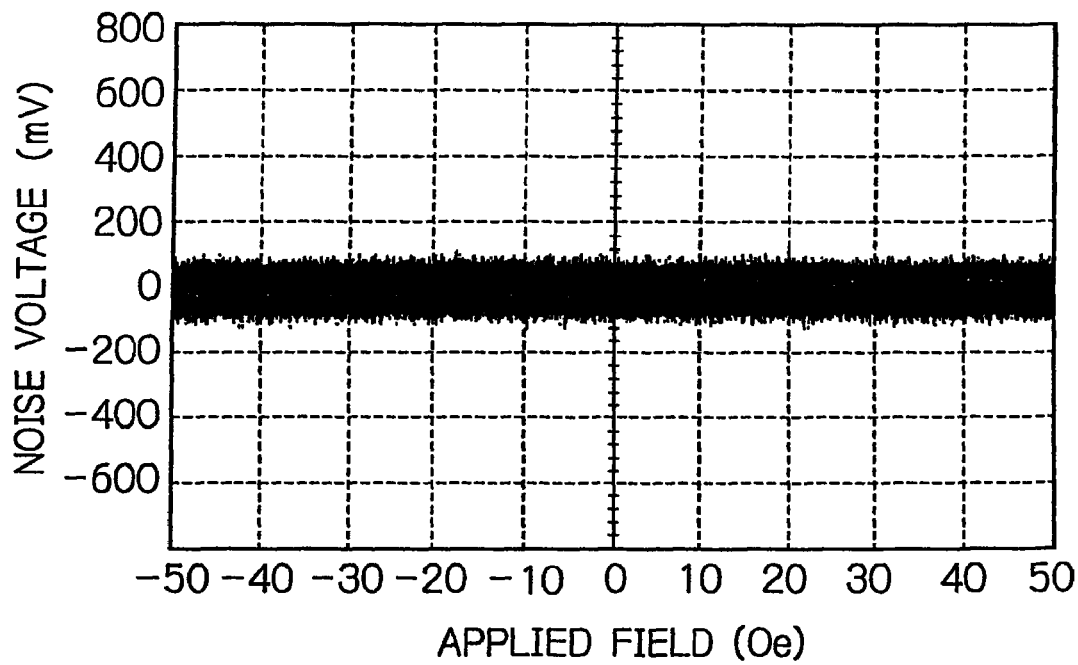
FIG. 7a shows a graph of the relation between an applied magnetic field and a noise voltage in the thin-film magnetic head according to the present invention.
Figure 7B:
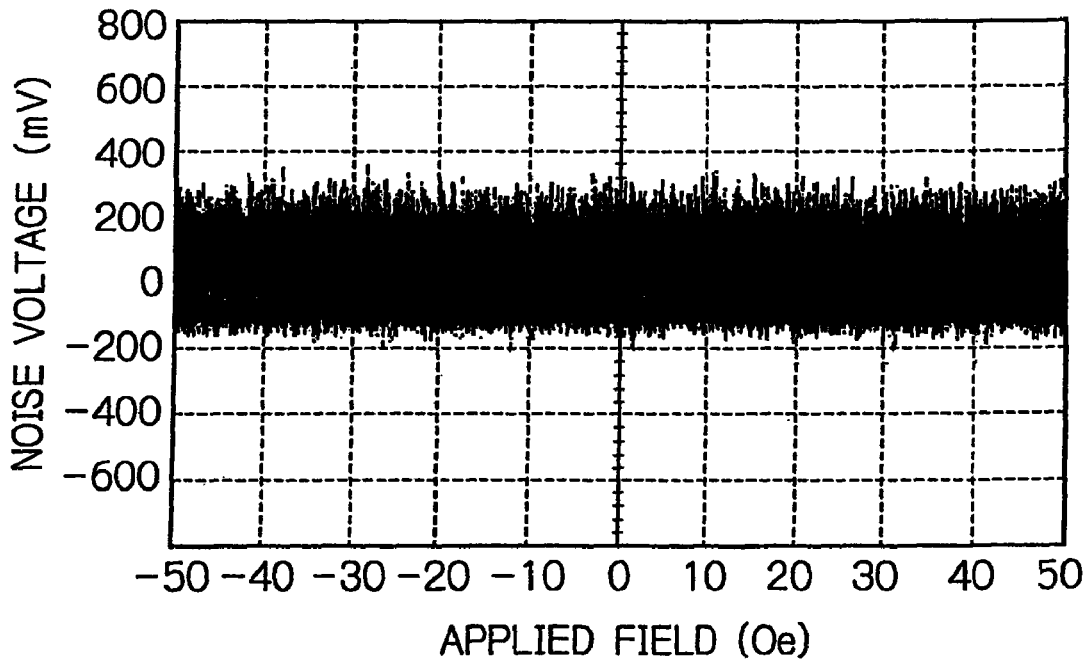
FIG. 7b shows a graph of the relation between an applied magnetic field and a noise voltage in the conventional thin-film magnetic head.

FIG. 7a shows a graph of the relation between an applied magnetic field and a noise voltage in the thin-film magnetic head according to the present invention, and FIG. 7b shows a graph of the relation between an applied magnetic field and a noise voltage in the conventional thin-film magnetic head.

The thin-film magnetic head according to the present invention used as a practical example had a TMR effect element for reading data, a protective coat formed of DLC, an antistatic layer formed of Ru in which a portion of the end surface on the ABS side was covered with the protective coat. The layer thickness of the protective coat was 3 nm, and the antistatic layer had a size that the width $W_{CP}$ in the track width direction was 10 μm and the layer thickness $T_{CP}$ was 50 nm. The antistatic layer was formed by the following process: After the lower electrode layer of the MR effect element was formed through planarization, Ru was deposited by using a sputtering method, and then the antistatic layer was formed by patterning the deposited Ru film with a lift-off method. The resistivity value of the Ru film was 15 μΩcm. The formed antistatic layer was connected to a ground pad of the head, to be connected to the suspension that is connected to ground by a connection line. The conventional thin-film magnetic head used as a comparative example had the same structure as the above-described head according to the present invention except for the non-existence of the antistatic layer.

As an advance preparation for measuring the noise voltage, both of the head according to the present invention and the conventional head were soaked in oxalic acid to have a static charge on the head end surface on the ABS side (on the protective coat). Further, in measuring the noise voltage, whether the noise is electric or not was judged by applying a magnetic field with intensity in a predetermined range. The bias voltage value was set to be 200 mV larger than the usual value during reading of about 150 mV to facilitate the observation of the electric noise. The noise voltage that corresponds to the vertical axes of both graphs in FIGS. 7a and 7b was an output voltage of the MR effect element during receiving no signal fields.

As shown in FIG. 7a, in the thin-film magnetic head having the antistatic layer according to the present invention, a popcorn noise, which is specific to the electric noise, is not observed at any point in the range of the applied field. On the other hand, as shown in FIG. 7b, in the conventional thin-film magnetic head without an antistatic layer, the popcorn noise is observed at every point in the range of the applied field. The noise does not depend on the applied field, therefore, it is understood that the noise is an electric noise. As just described, the thin-film magnetic head provided with the antistatic layer according to the present invention can sufficiently suppress the electric noise caused by the voltage potential difference between the MR effect element and the surface of the protective coat.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head comprising:
a substrate having an air bearing surface;
a read head element for reading data, formed on or above an element formation surface of said substrate, one end surface of said read head element reaching an head end surface on the air bearing surface side;
a protective coat formed on said head end surface in such a way to cover at least said one end surface of said read head element; and
at least one antistatic layer for preventing said protective coat from being electrostatically charged, formed on or above said element formation surface, one end surface of said at least one antistatic layer reaching said head end surface, said protective coat covering a portion, not the whole, of said one end surface of said at least one antistatic layer on said head end surface, wherein a charge moves between an opposed-to-medium surface of said protective coat and said at least one antistatic layer via a non-covered portion of said at one antistatic layer.

2. The thin-film magnetic head as claimed in claim 1, wherein a resistivity of said at least one antistatic layer is lower than a resistivity of said substrate.

3. The thin-film magnetic head as claimed in claim 2, wherein the amount of said resistivity of said at least one antistatic layer is less than 1000 micro-ohm centimeters.

4. The thin-film magnetic head as claimed in claim 2, wherein said substrate is formed of AlTiC, and said at least one antistatic layer is formed of a metal.

5. The thin-film magnetic head as claimed in claim 1, wherein said protective coat has a two-layered structure in which a base film and a protective film are sequentially stacked.

6. The thin-film magnetic head as claimed in claim 1, wherein said protective coat has a three-layered structure in which a base film, an intermediate film and a protective film are sequentially stacked, and a resistivity of said intermediate film is lower than both resistivities of said base film and said protective film.

7. The thin-film magnetic head as claimed in claim 1, wherein said at least one antistatic layer is provided adjacently on one side or on both sides in the track width direction of said read head element.

8. The thin-film magnetic head as claimed in claim 1, wherein said at least one antistatic layer is connected to ground.

9. The thin-film magnetic head as claimed in claim 8, wherein at least one of said at least one antistatic layer is electrically connected to said element formation surface of said substrate by a connect means.

10. The thin-film magnetic head as claimed in claim 1, wherein said read head element is a tunnel magnetoresistive effect element.

11. A head gimbal assembly comprising:
a thin-film magnetic head comprising:
a substrate having an air bearing surface;
a read head element for reading data, formed on or above an element formation surface of said substrate, one end surface of said read head element reaching an head end surface on the air bearing surface side;
a protective coat formed on said head end surface in such a way to cover at least said one end surface of said read head element; and
at least one antistatic layer for preventing said protective coat from being electrostatically charged, formed on or above said element formation surface, one end surface of said at least one antistatic layer reaching said head end surface,
said protective coat covering a portion, not the whole, of said one end surface of said at least one antistatic layer on said head end surface, wherein a charge moves between an opposed-to-medium surface of said protective coat and said at least one antistatic layer via a non-covered portion of said at least one antistatic layer;
signal lines for said read head element;
a connection line for connecting at least one antistatic layer to ground; and
a support means for supporting said thin-film magnetic head.

12. The head gimbal assembly as claimed in claim 11, wherein a resistivity of said at least one antistatic layer is lower than a resistivity of said substrate.

13. The head gimbal assembly as claimed in claim 12, wherein the amount of said resistivity of said at least one antistatic layer is less than 1000 micro-ohm centimeters.

14. The head gimbal assembly as claimed in claim 12, wherein said substrate is formed of AlTiC, and said at least one antistatic layer is formed of a metal.

15. The head gimbal assembly as claimed in claim 11, wherein said protective coat has a two-layered structure in which a base film and a protective film are sequentially stacked.

16. The head gimbal assembly as claimed in claim 11, wherein said protective coat has a three-layered structure in which a base film, an intermediate film and a protective film are sequentially stacked, and a resistivity of said intermediate film is lower than both resistivities of said base film and said protective film.

17. The head gimbal assembly as claimed in claim 11, wherein said at least one antistatic layer is provided adjacently on one side or on both sides in the track width direction of said read head element.

18. The head gimbal assembly as claimed in claim 11, wherein at least one of said at least one antistatic layer is electrically connected to said element formation surface of said substrate by a connect means.

19. The head gimbal assembly as claimed in claim 11, wherein said read head element is a tunnel magnetoresistive effect element.

20. A magnetic recording/reproducing apparatus comprising:
at least one head gimbal assembly comprising:
a thin-film magnetic head comprising:
a substrate having an air bearing surface;
a read head element for reading data, formed on or above an element formation surface of said substrate, one end surface of said read head element reaching an head end surface on the air bearing surface side;
a protective coat formed on said head end surface in such a way to cover at least said one end surface of said read head element; and
at least one antistatic layer for preventing said protective coat from being electrostatically charged, formed on or above said element formation surface, one end surface of said at least one antistatic layer reaching said head end surface,
said protective coat covering a portion, not the whole, of said one end surface of said at least one antistatic layer on said head end surface, wherein a charge moves between an opposed-to-medium surface of said protective coat and said at least on antistatic layer via a non-covered portion of said at least one antistatic layer;
signal lines for said read head element;
a connection line for connecting at least one antistatic layer to ground; and
a support means for supporting said thin-film magnetic head;
at least one magnetic disk; and
a recording/reproducing means for controlling read and write operations of said thin-film magnetic head to said at least one magnetic disk.

21. The magnetic recording/reproducing apparatus as claimed in claim 20, wherein a resistivity of said at least one antistatic layer is lower than a resistivity of said substrate.

22. The magnetic recording/reproducing apparatus as claimed in claim 21, wherein the amount of said resistivity of said at least one antistatic layer is less than 1000 micro-ohm centimeters.

23. The magnetic recording/reproducing apparatus as claimed in claim 21, wherein said substrate is formed of AlTiC, and said at least one antistatic layer is formed of a metal.

24. The magnetic recording/reproducing apparatus as claimed in claim 20, wherein said protective coat has a two-layered structure in which a base film and a protective film are sequentially stacked.

25. The magnetic recording/reproducing apparatus as claimed in claim 20, wherein said protective coat has a three-layered structure in which a base film, an intermediate film and a protective film are sequentially stacked, and a resistivity of said intermediate film is lower than both resistivities of said base film and said protective film.

26. The magnetic recording/reproducing apparatus as claimed in claim 20, wherein said at least one antistatic layer is provided adjacently on one side or on both sides in the track width direction of said read head element.

27. The magnetic recording/reproducing apparatus as claimed in claim 20, wherein at least one of said at least one antistatic layer is electrically connected to said element formation surface of said substrate by a connect means.

28. The magnetic recording/reproducing apparatus as claimed in claim 20, wherein said read head element is a tunnel magnetoresistive effect element.

* * * * *